July 17, 1962

P. BELDEN 3,044,077

CHLORINATOR FOR MARINE TOILETS WITH
COMBINED BEATER AND SYPHON

Filed July 13, 1960

Perry Belden
INVENTOR.

BY *Clarence A. O'Brien*
*and Harvey B. Jacobson*
Attorneys

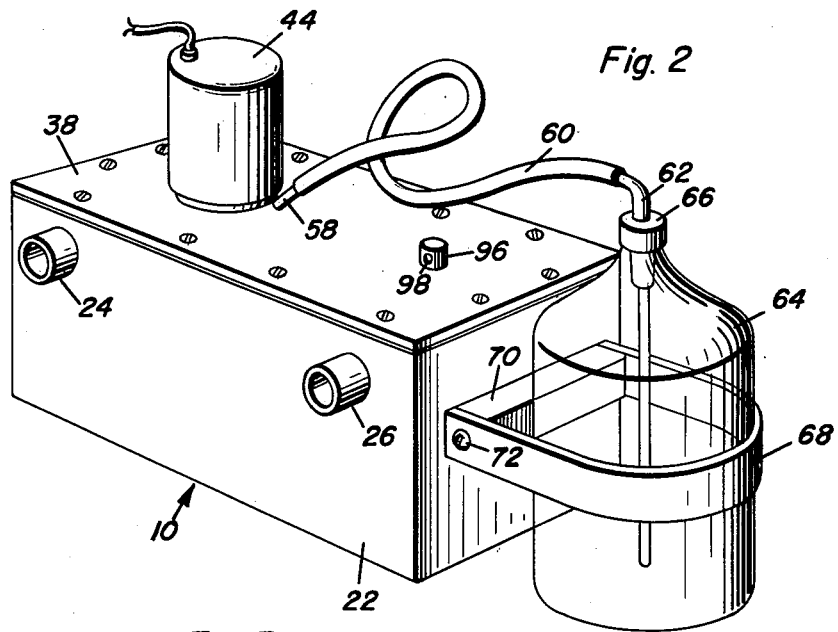
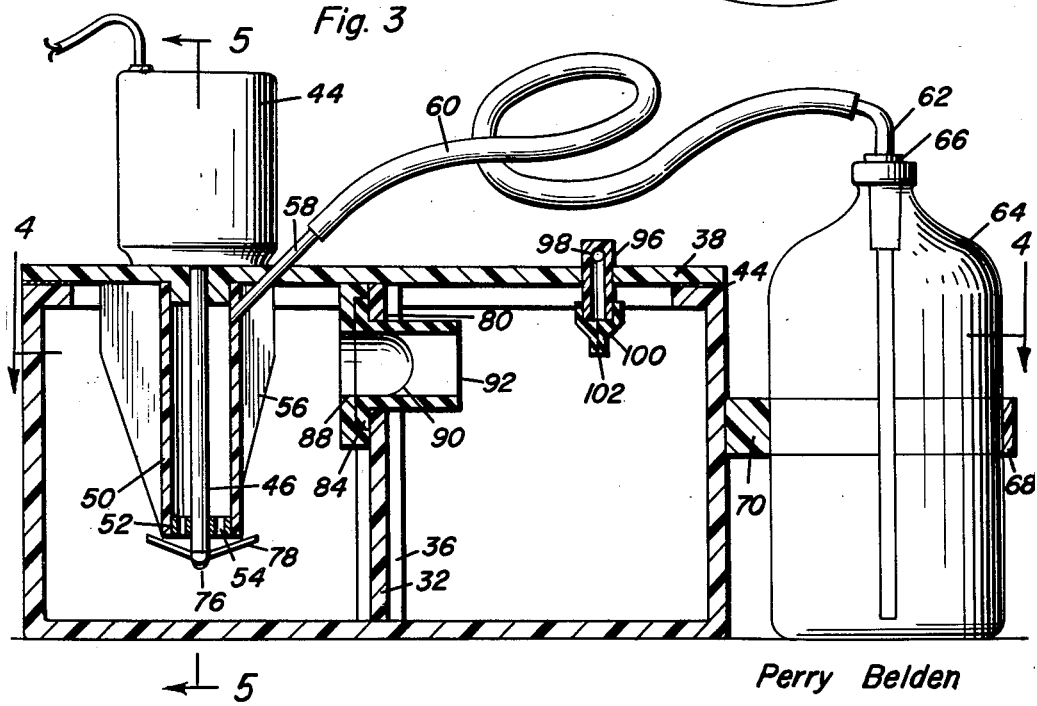

United States Patent Office 3,044,077
Patented July 17, 1962

3,044,077
CHLORINATOR FOR MARINE TOILETS WITH COMBINED BEATER AND SYPHON
Perry Belden, 13A Arlene Village, Millville, N.J.
Filed July 13, 1960, Ser. No. 42,695
9 Claims. (Cl. 4—10)

The present invention generally relates to a chlorinator for marine toilets for treatment of raw sewage before it is discharged from a boat and includes a novel arrangement of components which enables thorough intermingling of the treating agent with the sewage and also thoroughly disintegrating the sewage so that it is more easily intermingled with the treating agent.

The discharge of raw sewage from many boats has become a considerable health problem in many areas. In fact, regulations are existent in many areas which prevent the discharge of raw sewage directly into rivers, harbors, lakes and the like. Some effort has been made to overcome the problem as exemplified in pending application Serial No. 743,034 for Chlorinator for Marine Toilets, filed June 19, 1958 and this application concerns itself with novel improvements over the device disclosed in the above mentioned application.

The primary object of the present invention is to provide a chlorinator for marine toilets which is a complete attachment in itself and may be installed in any area in the discharge line of the soil pump, that is, between the soil pump and the overboard discharge and includes a novel means for syphoning a predetermined quantity of chlorine, bleach or other treating material from a supply container.

Another object of the present invention is to provide a chlorinator for marine toilets which includes a novel chopper or beater which thoroughly disintegrates the sewage and also serves as means for syphoning the treating agent into the device.

Still another object of the present invention is to provide a chlorinator for marine toilets in accordance with the preceding objects which incorporates a compartmented container separated by a partition whereby the sewage will stand in the compartments for further action of the treating agent before being discharged overboard, thereby providing a "hold" compartment which provides sufficient time for thorough action of the treating agent.

Another object of the present invention is to provide a marine toilet chlorinator which is simple in construction, easy to attach and assemble into existing marine toilet systems, relatively inexpensive to operate, quite efficient in treating sewage and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a perspective view of the chlorinator of the present invention;

FIGURE 3 is a longitudinal sectional view of the chlorinator illustrating the structural details thereof;

Figure 1:
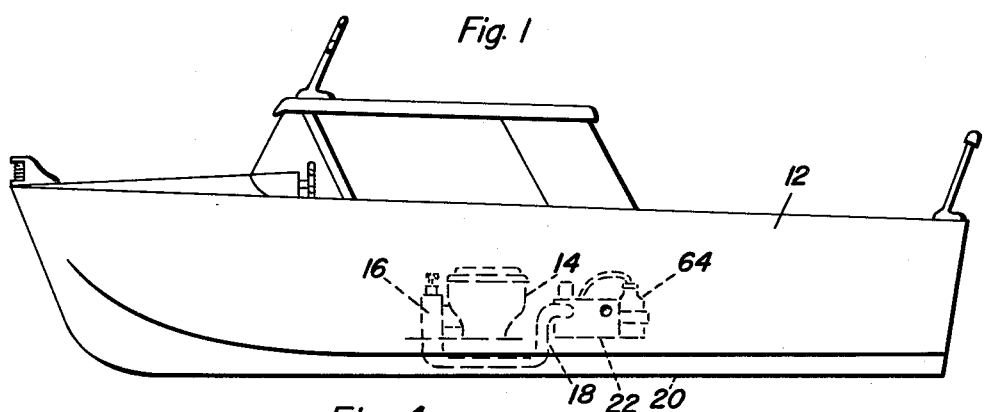
FIGURE 1 is a side elevational view illustrating schematically the orientation of the chlorinator and the relationship thereof to the marine toilet and the boat.
Figure 4:
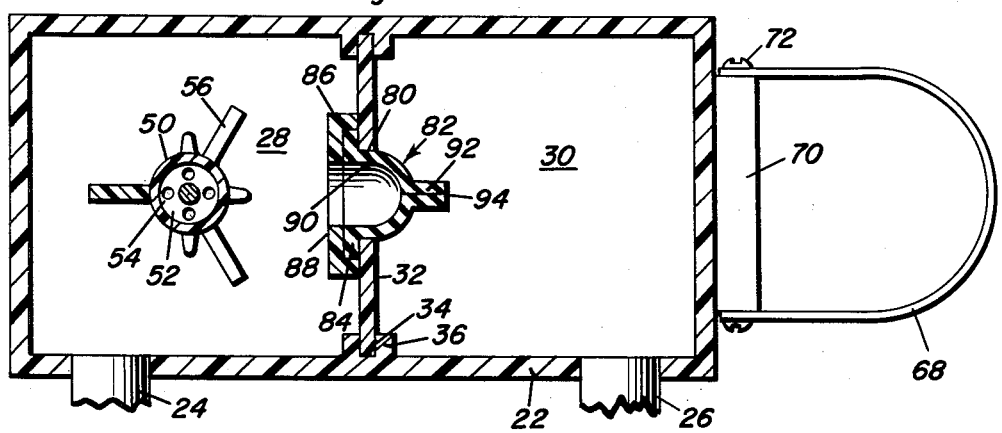
FIGURE 4 is a top plan sectional view of the present invention illustrating further structural details of the chlorinator.
Figure 5:
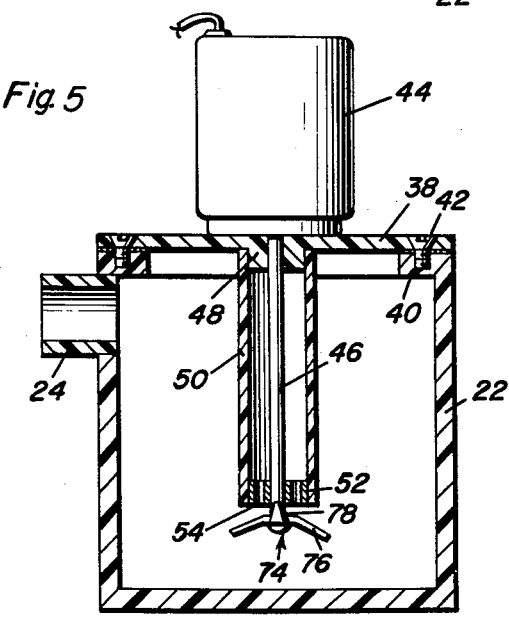
FIGURE 5 is a detailed sectional view taken substantially upon a plane passing along section line 5—5 of FIGURE 3 illustrating further structural details of the cutter or beater together with the syphoning arrangement.

Referring now specifically to the drawings, the numeral 10 generally designates the chlorinator of the present invention installed in any convenient position within a boat 12 and generally adjacent to a marine toilet 14 having the usual soil pump 16 associated therewith or the chlorinator may be associated with any type of marine toilet whatsoever as long as the discharge line from the marine toilet designated by the numeral 18 is connected with the chlorinator 10 and the overboard discharge line 20 is also connected with the chlorinator 10.

The chlorinator 10 includes a generally rectangular receptacle 22 having an inlet 24 adjacent one upper corner thereof and an outlet 26 adjacent the other upper corner thereof. The inlet 24 is connected with the discharge line 18 from the marine toilet or soil pump while the discharge fitting 26 is connected with the overboard discharge line. The assembly may be adapted for various installations by reversing the inlet and outlet by permitting the fitting 26 to be the inlet and the fitting 24 to be the outlet thus enabling it to be installed in various locations.

The interior of the receptacle 22 is divided into two compartments 28 and 30 by a removable partition 32 slidably received in vertical guides 34 formed by vertical flanges 36 formed on the side walls of the receptacle or container 22. The fitting 24 communicates with the compartment 28 and the fitting 26 communicates with the compartment 30.

The other end of the receptacle 22 is closed by a removable top plate or wall 38 resting on an inturned flange 40 and secured thereto by screw threaded fasteners 42 or any other suitable fastening means and a suitable seal 44 may be provided under the top plate 38 thus retaining the top plate in sealed relation to the container 22.

Mounted on the top plate adjacent one end thereof is an electric motor 44 having a depending shaft 46 extending downwardly into the interior of the container or receptacle 22. The top plate 38 is provided with a depending boss 48 thereon in encircling relation to the shaft 46 and a cylindrical tubular member 50 is connected with the boss 48 and extends downwardly in concentric encircling relation to the shaft 46. The lower end of the cylindrical member 50 is provided with a closure plug 52 having a plurality of apertures 54 therein. The apertures 54 communicate the interior of the cylindrical member 50 with the area immediately above the lower end of the shaft 46 which is disposed below the plug 52. Thus, the plug 52 forms a bearing for the shaft 46. Also, stabilizing fins or gussets 56 are integral with the cylindrical member 50 and engage the top plate 38 for further rigidifying the cylindrical member 50.

Extending upwardly in an angular direction from the cylindrical member 50 is a small tube 58 which extends from the interior of the cylindrical member 50 adjacent the upper end thereof to and above the top surface of the top plate 38. The tube 58 is connected with a flexible tubing 60 extending into a tube 62 extending downwardly into the interior of a receptacle 64 for a liquid treating agent such as a bleach, a liquid containing chlorine or other suitable treating agents. The tube 62 is mounted in the receptacle 64 by a stopper or closure 66 which also enables the inlet of air into the container 64 to enable the liquid to be syphoned therefrom in a manner described hereinafter. For retaining the treating agent receptacle 64 in place, there is provided a generally U-shaped strap 68 having the ends thereof terminally secured to a block 70 extending outwardly from one end wall of the receptacle 22. Fastening members 72 are employed for retaining the strap 68 in place thus enabling ready replacement of the receptacle 64 or at least replacement thereof with a full receptacle.

Mounted on the lower end of the shaft 46 is a combination beater or cutter and circulator generally designated by the numeral 74 which includes two downwardly inclined blades 76 which act as cutters or beaters and two upwardly inclined blades 78 which act as a pump or circulator. The upwardly inclined blades 78 are orientated in such a manner that rotation thereof causes a downward movement of the material at the center of the shaft 46 thus exhausting material from the interior of the cylindrical member 50 and reducing the pressure in the interior of the cylindrical member 50 thus syphoning the liquid treating agent from the receptacle 64 into the cylindrical member 50 where it discharges through the openings 54 into the sewage in the compartment 28. This cutter assembly 74 also serves to thoroughly cut and chop the sewage into very small particles and at the same time circulate the sewage and the liquid treating agent for thoroughly intermingling the same.

The partition wall 32 is provided with an opening 80 adjacent the upper end thereof which includes a joker valve generally designated by the numeral 82. The joker valve 82 includes a circular flange 84 resting against the surface of the partition wall 32 facing the compartment 28 and being retained in position by a retaining flange 86. The retaining flange 86 is provided with an opening 88 in alignment with an opening 90 forming the entrance to the joker valve. The joker valve is provided with a pair of flaps 92 normally held together by the resiliency of the material from which the joker valve is constructed and the flaps are separated by a slit 94. Thus, when pressure is exerted on the cylindrical portion 90 of the joker valve, the slit 94 will be spread apart thus permitting discharge of the liquid material from the compartment 28 into the compartment 30. This will assure that only flow is permitted in one direction, that is, from the compartment 28 to the compartment 30. Reverse flow is prevented since the joker valve will close when pressure is released on the inlet side thereof.

The top plate 38 is also provided with an air inlet fitting 96 extending therethrough and having an opening 98 adjacent the top thereof for admitting air. The bottom of the fitting 96 is also provided with a smaller joker valve 100 mounted thereon which has an openable slit 102 which will admit air into the interior of the compartment 30 in the event of any reduction of pressure therein whereby atmospheric air is available to the interior of the compartment 30.

The entire procedure may be reversed by merely re-orientating the top plate and reversing the partition plate 32 in an obvious manner. This would permit the inlet and outlet of the chlorinator to be switched thereby enabling more flexibility in the manner of installation of the chlorinator.

In operation, the device is installed in the sewage line between the toilet and the overboard discharge and assuming that the tank or container is empty, the person who uses the marine toilet will close a suitable switch to an electrical supply which will operate the motor by virtue of conventional electrical conductors and the like and the switch may be of the time control type in that it will close the circuit for a predetermined length and then automatically open. When the motor is operated, the sewage which has been discharged into the first compartment will be thoroughly chopped, disintegrated or the like by the action of the rotating cutter blades. Also, the rotating circulating blades will cause the pressure within the cylindrical member to be reduced thus syphoning a predetermined quantity of liquid chlorinating agent into the interior of the compartment and thus thorough intermingling or mixing the bleaching agent or chlorinating agent with the sewage. After the motor stops, the mixed sewage material and chlorinating agent will remain in the first compartment until such time as the marine toilet is again used. When this occurs, the incoming sewage will force the material in the first compartment into the second compartment and the person using the marine toilet will again operate the switch for starting the chlorinator motor thus repeating the operation of chlorinating the sewage and at the same time chopping or grinding the sewage and also mixing the sewage with the chlorinating agent. The treated sewage will still be retained in the second compartment and also in the first compartment until such time as another use of the marine toilet is undertaken. Discharge from the marine toilet then will force out the sewage which is in the second compartment into the overboard discharge but by this time, sufficient time has elapsed to provide complete intermingling or mixing of the sewage with the treating material and also enables the treating material to effectively carry out its purpose. Thus, a step-by-step arrangement is provided which provides a delay or setting period for the mixed sewage and treating agent thereby enabling the treating agent to be effective prior to its discharge overboard where the water will dilute the sewage and chlorinating agent to such an extent that the chlorinating agent then becomes ineffective. Thus, the holding action of the second compartment where the mixed sewage and chlorinating agent is retained for a time provides adequate time for proper operation of the chlorinating agent.

The entire device may be constructed of plastic or any other suitable relatively inexpensive material although plastics are well suited due to their imperviousness to corrosive action by the sewage and chlorinating agent.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A chlorinating attachment for marine toilets comprising a receptacle, a partition dividing the receptacle into two compartments, an inlet for the first compartment and an outlet for the second compartment, said inlet adapted to receive sewage from a marine toilet, said outlet adapted to discharge treated sewage to an overboard discharge, a combined pump and grinding means disposed in the first compartment for thoroughly cutting and chopping the sewage into fine components and pumping chlorinating agent into the compartment and thoroughly intermingling the chlorinating agent and the sewage, and means in the partition for permitting discharge of treated sewage from the first compartment to the second compartment.

2. The structure as defined in claim 1 wherein said means in the first compartment includes a generally vertically disposed driven shaft, a cylindrical member enclosing the shaft, a tube communicated with the cylindrical member and extending to a supply of chlorinating agent, said cylindrical member having openings at the bottom thereof, a multi-bladed cutter and agitator mounted on the lower end of the shaft slightly below the bottom of the tube and including a pair of blades inclined downwardly for cutting and chopping sewage and a pair of upwardly inclined tilted blades for agitating the material and exhausting material from the cylindrical member thereby reducing the pressure therein for syphoning chlorinating agent from the supply thereof thus thoroughly intermingling the chlorinating agent and the chopped sewage.

3. The structure as defined in claim 1 wherein said means in the partition includes a resilient joker valve having a normally closed discharge slit openable by exertion of pressure thereon and normally closed when in relaxed position thereby permitting flow of liquid into the second compartment from the first compartment but preventing reverse flow.

4. The structure as defined in claim 3 wherein said second compartment is provided with an air inlet having a check valve therein for enabling air to flow into the second compartment.

5. The structure as defined in claim 1 wherein said partition is removable and reversible for enabling flow in either direction when reversed, said combined grinding and pumping means being mounted on a removable symmetrical top plate capable of being reversed thereby enabling the inlet and outlet in relation to the receptacle to be altered for flexibility in installation.

6. In combination with a marine toilet having a soil pump for flushing the toilet and pumping waste material therefrom, a chlorinator comprising a receptacle receiving waste material from the soil pump, an outlet for the receptacle disposed adjacent the top thereof for discharging material from the receptacle, means mounted in said receptacle for agitating and cutting the waste material, said means including a cutter having a plurality of blades thereon inclined in relation to the rotational axis for agitating the waste material, a chlorinating agent supply, a tube communicated with the supply and an area of reduced pressure coaxial with the axis of rotation of the cutter for syphoning chlorinating agent from the supply into the receptacle, said reduced pressure area being caused by the rotation of the cutter and the inclination of the blades thereon causing axial flow of the waste material past the cutter thus forming an area of reduced pressure for syphoning the chlorinating agent from the supply directly into the receptacle.

7. The structure as defined in claim 6 wherein said reduced pressure area is enclosed by a tubular sleeve concentric with the axis or rotation of the blade, said tubular sleeve having an open area in the end thereof adjacent the cutter whereby movement of the waste material will be past the open area in the sleeve and then past the cutter in an axial direction thus reducing the pressure in the sleeve, said tube from the chlorinating agent supply being communicated with the sleeve, said sleeve being closed except for the end thereof adjacent the cutter.

8. The structure as defined in claim 7 wherein said cutter is mounted on a vertically disposed shaft, said sleeve being concentric with the shaft and including a lower end journaling the shaft thus supporting and stabilizing the shaft, said open area in the end of the sleeve being formed by a plurality of openings in the bottom of the sleeve disposed adjacent the cutter.

9. The structure as defined in claim 8 wherein said receptacle is provided with a partition dividing the receptacle into two compartments, said cutter being located in one compartment, the other compartment having an air vent means, said partition sealing the compartments from each other, and check valve means adjacent the upper end of the partition for communicating the compartments when pressure is built up in the compartment having the cutter therein.

References Cited in the file of this patent
UNITED STATES PATENTS

| | | |
|---|---|---|
| 1,303,358 | Montgomery | May 13, 1919 |
| 2,865,028 | Patenaude | Dec. 23, 1958 |
| 2,951,251 | Belden | Sept. 6, 1960 |